US00RE35982E

United States Patent [19]

Freund

[11] E Patent Number: Re. 35,982

[45] Reissued Date of Patent: Dec. 8, 1998

[54] HIGH SPEED CROSSLAPPER

[75] Inventor: Kenneth S. Freund, Hendersonville, Tenn.

[73] Assignee: E. I. du Pont de Nemours and Company, Wilmington, Del.

[21] Appl. No.: 136,269

[22] Filed: Oct. 15, 1993

Related U.S. Patent Documents

Reissue of:

[64] Patent No.: 4,984,772
Issued: Jan. 15, 1991
Appl. No.: 351,918
Filed: May 15, 1989

[51] Int. Cl.[6] ..... B65H 29/46

[52] U.S. Cl. ..... 270/30; 270/39; 19/163

[58] Field of Search ..... 270/30, 31, 39; 19/163

[56] References Cited

U.S. PATENT DOCUMENTS

| | | | |
|---|---|---|---|
| 2,927,350 | 3/1960 | Nelson | 19/163 |
| 3,558,029 | 1/1971 | Manns | 226/108 |
| 3,638,279 | 2/1972 | Swados . | |
| 3,682,734 | 8/1972 | Burger . | |
| 3,851,681 | 12/1974 | Egan | 139/420 |
| 3,877,628 | 4/1975 | Asselin et al. | 226/113 |
| 3,906,588 | 9/1975 | Zafiroglu . | |
| 4,107,822 | 8/1978 | Brown . | |
| 4,273,981 | 6/1981 | Nopper | 219/10.49 R |
| 4,376,455 | 3/1983 | Hahn | 139/383 |
| 4,379,735 | 4/1983 | MacBean | 162/348 |
| 4,408,637 | 10/1983 | Karm | 139/425 |
| 4,481,694 | 11/1984 | Dilo | 19/163 |
| 4,830,351 | 5/1989 | Stainislaw | 270/31 |

FOREIGN PATENT DOCUMENTS

| | | | |
|---|---|---|---|
| 1168504 | 5/1987 | Italy . | |
| 1474300 | 5/1977 | United Kingdom . | |
| 1527230 | 10/1978 | United Kingdom | 19/163 |

*Primary Examiner*—Thomas E. Denion

[57] ABSTRACT

A crosslapper is disclosed utilizing at least one foraminous transporting belt to permit rapid escape of entrained air during fast operation of wide-bed machinery.

4 Claims, 4 Drawing Sheets

HIGH SPEED CROSSLAPPER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to devices used in the manufacture of nonwoven sheeting and, specifically, to devices known as crosslappers which provide a means for transferring filaments or fleece from a feed means such as a carding machine to a delivery means such as a laydown machine in such a way that the laydown machine receives a web of uniform thickness and density and, if desired, of modified weight basis and width.

2. Description of the Prior Art

U.S. Pat. No. 3,877,628, issued Apr. 15, 1975 on the application of Asselin et al., discloses a crosslapper having a certain guide belt arrangement to minimize disruption of the fleece by air flow during high speed operation of the device. That patent recognizes the difficulty of eddies of air which blow the fleece and disrupt the web in high speed operation, and attempts to improve the situation by carrying the fleece between two closely-positioned guide belts prior to the fleece transfer. There is no mention of the construction of guide belts used therein.

U.S. Pat. No. 3,558,029, issued Jan. 26, 1971 on the application of Manns, discloses a crosslapper in which a carded web is advanced by being positively held between conveyer belts. This arrangement is said to deposit the web evenly and without formation of folds. It is said that the conveyer belts can be formed from continuous fabrics made from synthetic material.

British Patent No. 1,527,230, published Oct. 4, 1978 on the application of Jowett, discloses a modified crosslapper wherein there is provision for the lattices or conveyer belts to operate at variable speeds throughout each cycle. There is no mention of the kind or construction of the conveyer belts.

U.S. Pat. No. 3,851,681, issued Dec. 3, 1974 on the application of Egan, U.S. Pat. No. 4,376,455, issued Mar. 15, 1983 on the application of Hahn, and U.S. Pat. No. 4,408,637, issued Oct. 11, 1983 on the application of Karm, disclose woven fabrics useful as the support belt for papermaking processes.

U.S. Pat. No. 4,379,735, issued Apr. 12, 1983 on the application of MacBean, discloses a particular construction of woven fabric for use on so-called "twin wire" paper making machines.

In the field of airlay crosslappers, it has been customary for fleece transporting belts to be made from impermeable material and, as can be seen from the references discussed above, it has been customary to minimize the effects of air eddies in the lay-down by means of sandwiching the fleece between two belts. In the field of papermaking machines, it has been customary to use foraminous screens to strain water from the so-called "furnish" during wetlay. Crosslappers and papermaking machines are from entirely different fields and references from one field do not suggest any application in the other field. Nevertheless, the present invention relates to crosslappers utilizing fleece transporting belts made from foraminous fabrics with significant void fraction.

SUMMARY OF THE INVENTION

The present invention provides a crosslapper comprising fleece feed means, at least one endless, foraminous, fleece transporting belt for accepting fleece from the fleece feed means; reciprocating belt carriage means for moving the fleece transporting belt continuously through the endless length of the belt means and reciprocatingly in a rectilinear path; and fleece delivery means for accepting fleece from the fleece transporting belt and moving it continuously in a rectilinear path substantially perpendicular to the path of the reciprocating belt carriage means.

The foraminous fleece transporting belt is important to this invention for the purpose of providing an escape for air entrained during acceptance of the fleece from the fleece feed means in high speed operation. The foraminous fleece transporting belt has a significant void fraction to ensure the ready passage of air in both directions during operation of the crosslapper.

DETAILED DESCRIPTION OF THE INVENTION

A crosslapper for use in building webs of fleece must be constructed such that the fleece is carried from a feed means and laid, in a reciprocating manner, onto a further delivery means rapidly and with a minimum of disruption.

There are several forces at work on the crosslapper machinery and on the fleece, itself, which cause the fleece to be dislocated. One of the most important forces is the eddying of air currents around the fleece. The fleece is of extremely low bulk density and the rapid, reciprocating movement of the massive crosslapper creates a considerable movement of air which blows the fleece out of its proper position.

The tendency of recent operation is for crosslappers to be required to operate with wider beds and at faster speeds. The increased sizes and the increased speeds both contribute to the aforementioned eddying effects. As was previously discussed, the eddying effects have, in the past, been reduced by means of sandwiching the fleece between two transporting belts so that the fleece is held in place. There has arisen a problem with the sandwiching, also, however, in that the moving of two transporting belts into close proximity causes a squeezing or compressing of the delivered air and fleece. The air must escape from between the belts before the "fleece sandwich" is completed. Moreover, in high speed operation, the belts which sandwich the fleece are subject to independent movement and to irregular flapping movement toward and away from each other. Such flapping movement causes the sandwiched fleece to be disturbed and moved and displaced. Again, due to wider beds and higher speeds, it is more and more difficult to operate successfully.

It has, also, been found important to provide for passage of air in the other direction, back into the fleece when the fleece is being held between two belts and the belts are quickly separated. On separation of the belts during high speed processing, air must rush in to fill the space created by the separation. In lightweight fleece, this inrush of air causes the edges of the fleece to be forced in and folded, which causes defects in the final fleece blanket. The deleterious effects of inrushing air are greatly reduced when the air can come in through the belts rather than around them.

In the past, crosslapper transporting belts have been continuous, impermeable, sheets of fabric or film. The sandwiching, or two-belt crosslappers, have been designed such that the air can pass only in and out of the sides of the belt systems. The increased width and speeds have made such air escape more difficult and practically nonfeasable. The present invention presents an alternative and solves, the problem of air escape for two-belt, crosslapper systems and for crosslapper systems which pass fleece between a belt and a roll.

Figure 1:
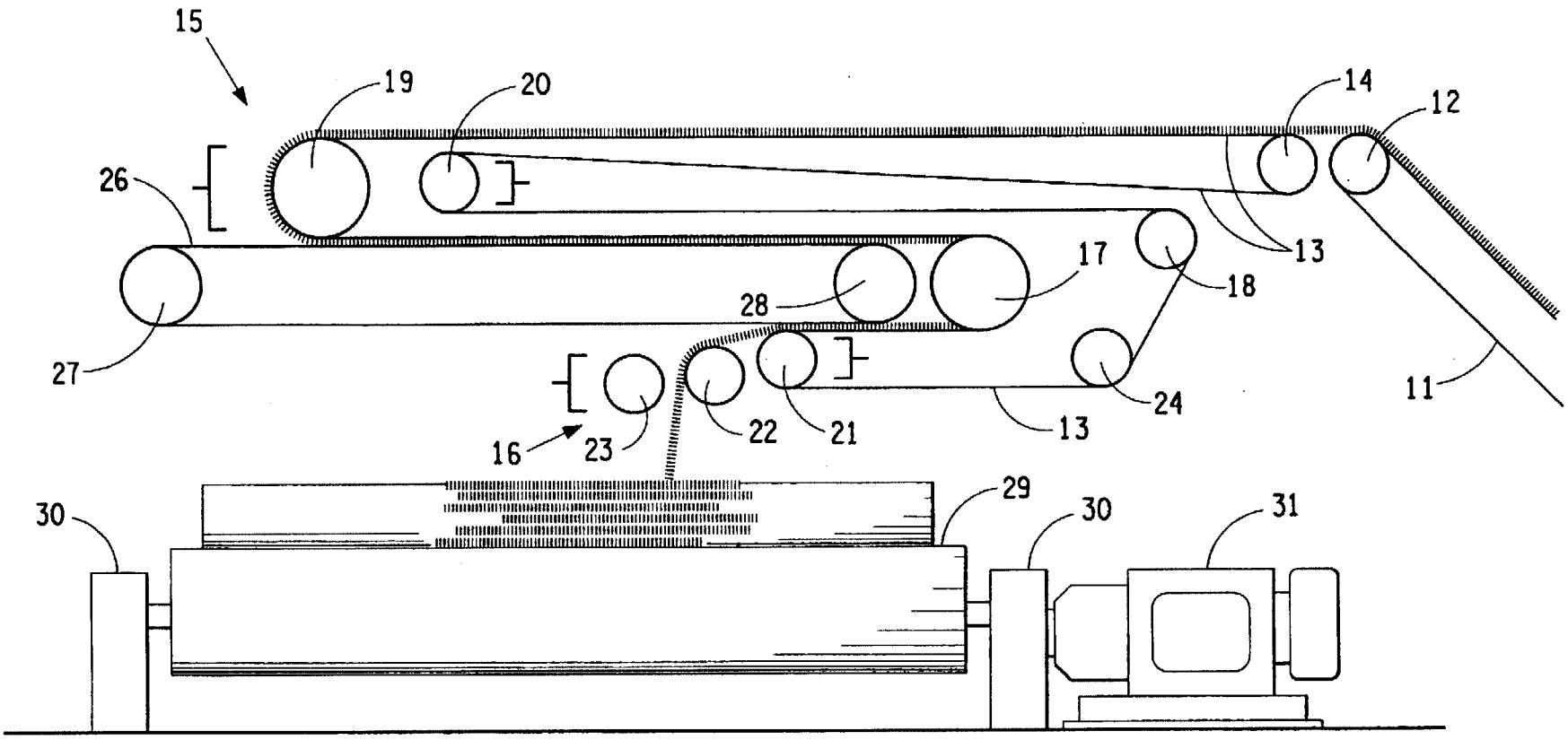
FIG. 1 is a simplified representation of a crosslapper of general nature improved by means of foraminous fleece transporting belts.

The crosslapper represented in FIG. 1 is of a familiar general design and is used herein for purposes of illustrating this invention. In that crosslapper, fleece feed means 11 is a belt running on roll 12 and a mating roll not shown. By means of fleece feed means 11 fleece is introduced to the crosslapper, itself. Fleece feed means can be a belt, as shown, or it can be the delivery end of a carding machine or an interface with any other fleece preparation device. The fleece feed means can be one end of the fleece transporting belt which has merely been positioned to receive fleece from some outside agency for the crosslapping operation. The fleece feed means can, also, be represented by a single, continuous, belt which effectively joins the crosslapper of this invention with a fleece preparing device such as an airlay device. From fleece feed means 11, fleece is moved to or on fleece transporting belt 13. Fleece transporting belt 13 is an endless belt, of foraminous nature, threaded among fixed and movable rollers as will be described. Fixed roller 14 is located in close proximity to roller 12 so that there can be a successful transfer of fleece from the fleece feed means to the fleece transporting belt. Fleece transporting belt 13 is passed around reciprocating belt carriage means 15 and 16; and, between those reciprocating belt carriage means, the fleece transporting belt is passed around a pair of fixed rollers 17 and 18. Reciprocating belt carriage means 15 includes roller 19 which carries the fleece in a reciprocating manner at the upper end of the crosslapper and roller 20 which serves as a loop control for the upper end of fleece transporting belt 13. Reciprocating belt carriage means 16 includes roller 21 which carries the fleece in a reciprocating manner at the lower end of the crosslapper and delivers the fleece through fleece delivery means made up of rollers 22 and 23 to fleece receiving means 29. Roller 24 can serve as an idler roll for the purpose of maintaining a proper tension on the belt system.

The fleece is moved from fleece transporting belt 13 to fleece transporting belt 26 which is continuously run on fixed rollers 27 and 28. Fleece transporting belts 13 and 26 sandwich the fleece to hold it in place until such time that it is moved into the reciprocating carriage means 16 and through the fleece delivery means 22 and 23. The fleece passes through fleece delivery means 22 and 23 and is laid on fleece receiving means 29 continuously in a rectilinear path substantially perpendicular to the path of the reciprocating carriage means.

Fleece receiving means 29 is generally a continuously-moving belt which leads to additional processing of the crosslapped fleece laid thereon. The fleece receiving means 29 can be mounted in a support 30 and driven by a rotating means 31.

Figure 2:
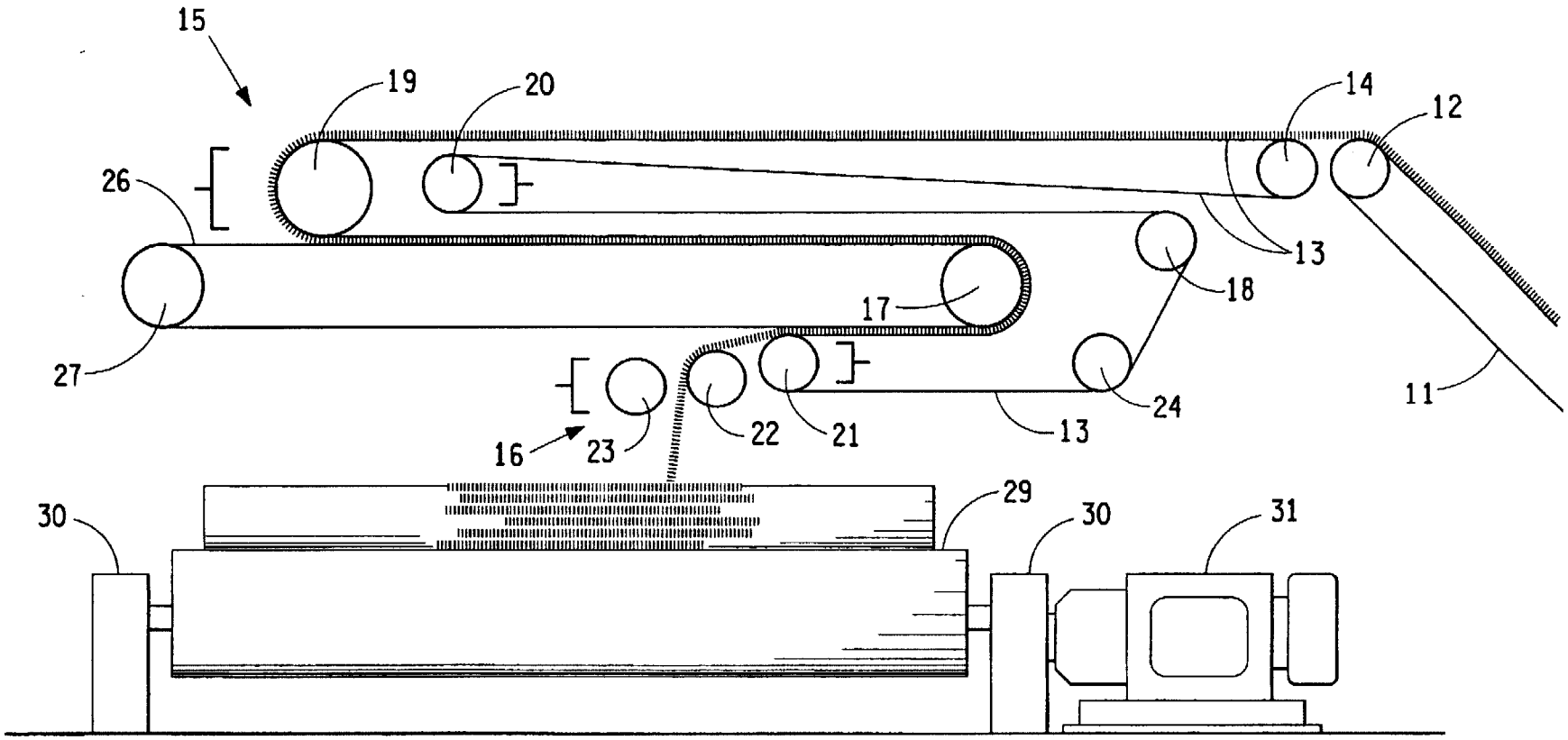
FIG. 2 is a representation of how it can be altered and further improved by means of foraminous fleece transporting belts in accordance with this invention.

The crosslapper represented in FIG. 2 is the same as that shown in FIG. 1 except that, in the case where foraminous transporting belts are used, one of the rollers can be omitted for even more efficient operation In the crosslapper of FIG. 1, when impermeable transporting belts are used, there is a need for having roller 17 to support the transporting belt 13 and a separate roller 28 to support the transporting belt 26. Without separate rollers, when impermeable belts are used at high speed operation, the fleece is blown out the sides of the belts. In the crosslapper of FIG. 2 (elements corresponding to elements in FIG. 1 bear the same numbers) roller 28 has been eliminated and both transporting belts 13 and 26 are run over roller 17. Because the transporting belts are foraminous, the fleece can be conducted as a sandwich continuously from its introduction to transporting belt 26, at the upper end of the crosslapper, to its separation from the transporting belts at the lower end of the crosslapper; and there is no longer any need for the space between rollers 17 and 28 of the device in FIG. 1, under high speed operation, to prevent blowing the fleece away from the rollers.

Figure 3:
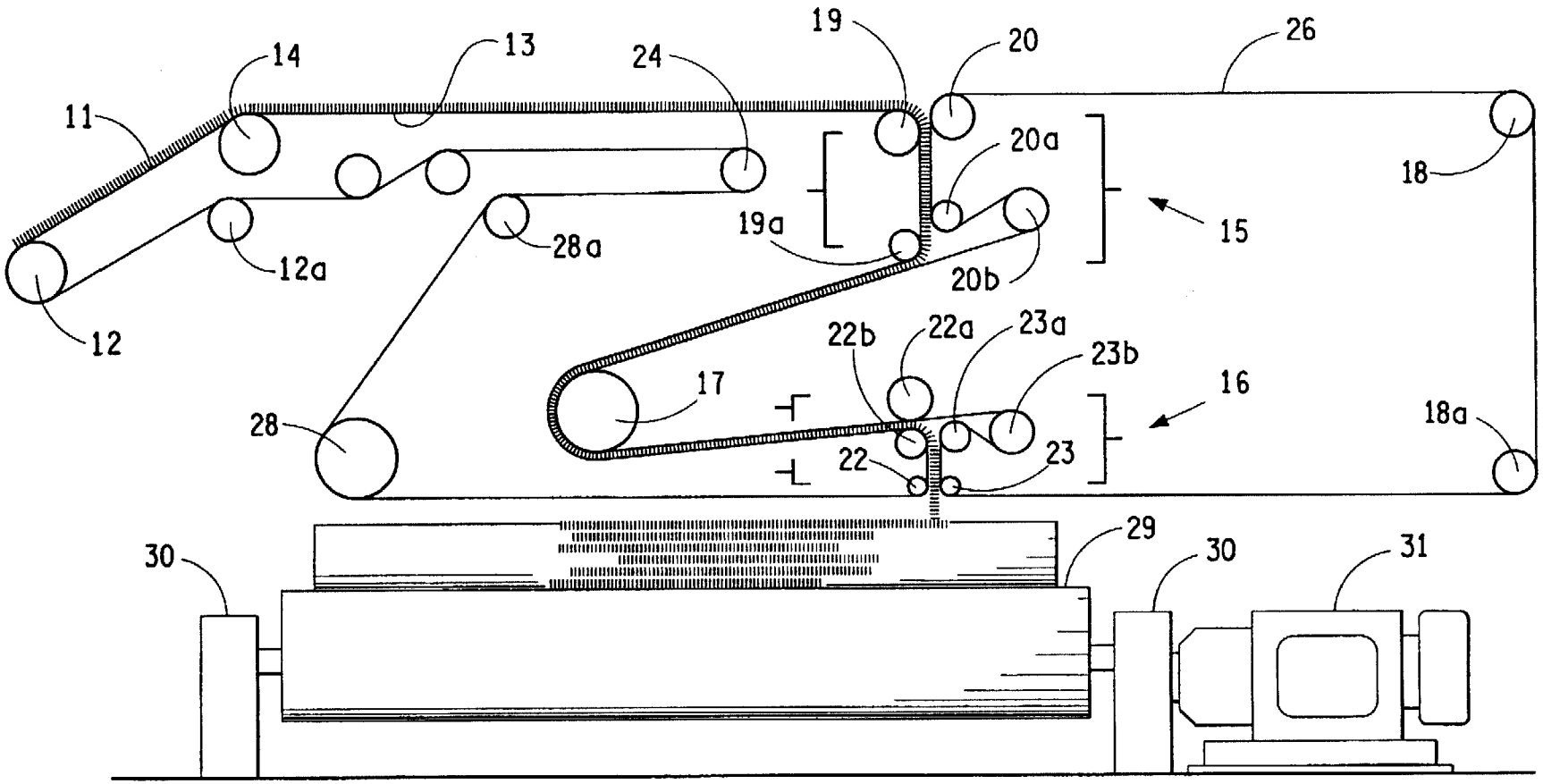
FIG. 3 is a simplified representation of another crosslapper of general nature improved by means of foraminous fleece transporting belts.

The crosslapper of FIG. 3 is similar to that described in U.S. Pat. No. 3,877,628. In that crosslapper, feed means 11 is a section of fleece transporting belt 13 onto which fleece is fed. Fleece transporting belt 13 is an endless belt, of foraminous construction. Fixed rollers 12, 12a, and 14 support belt 13 at the fleece feeding end. Belt 13 is passed through reciprocating belt carriage means 15, around fixed roller 17, through reciprocating belt carriage means 16, and back to fixed rollers 28 and 28a. The endless loop is completed by idler roller 24 which maintains tension on belt 13. In the crosslapper of FIG. 3, endless, foraminous, fleece transporting belt 26 passes through reciprocating belt carriage means 15, around fixed roller 17, and through reciprocating belt carriage means 16 along, and in the same path with, fleece transporting belt 13. The fleece transporting belt 26, however, is run around fixed rollers 18 and 18a to maintain proper tension on the belt.

Fleece is moved from fleece feed means 11 and fleece transporting belt 13 to the reciprocating carriage means 15 where the fleece is sandwiched between fleece transporting belt 13 and fleece transporting belt 26. The fleece is sandwiched between the fleece transporting belts until is reaches reciprocating carriage means 16 where it passes through rollers 22 and 23 of the fleece delivery means which are included in, and carried along with, reciprocating carriage means 16. Fleece passed through the fleece delivery means is laid on fleece receiving means 29 continuously in a rectilinear path substantially perpendicular to the path of the reciprocating carriage means.

Figure 4:
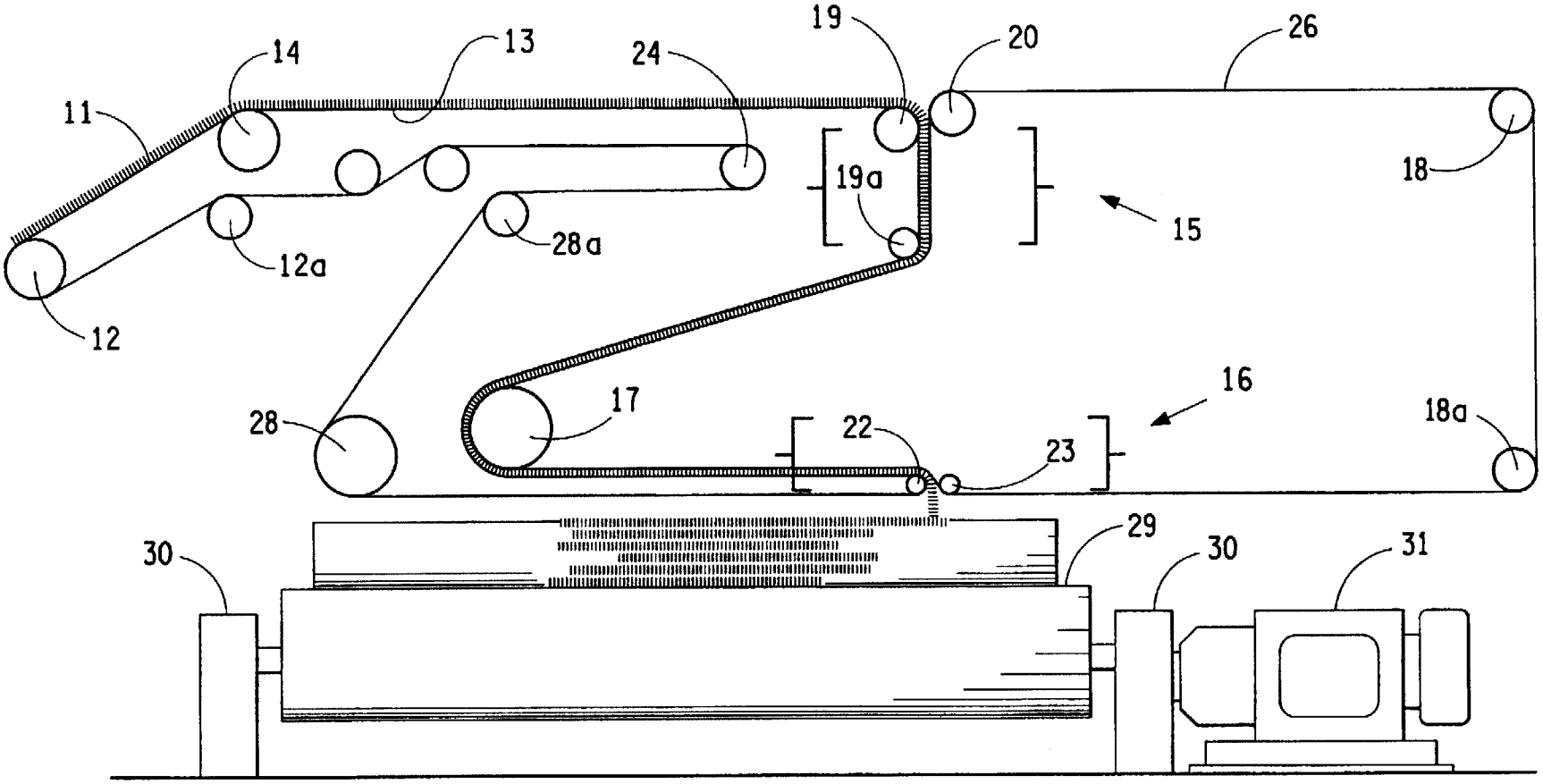
FIG. 4 is a representation of how it can be altered and further improved by means of foraminous fleece transporting belts in accordance with this invention.

The crosslapper represented in FIG. 4 is the same as that shown in FIG. 3 except that, in the case where foraminous transporting belts are used, several of the rollers can be omitted for even more efficient operation. In the crosslapper of FIG. 3, when impermeable fleece transporting belts are used, there is a need for having several rollers included in the reciprocating carriage means. Without such rollers, when impermeable belts are used at high speed operation, the fleece is blown out the sides of the belts. In the crosslapper of FIG. 4 (elements corresponding to elements in FIG. 3 bear the same numbers) rollers 20a and 20b have been eliminated from reciprocating carriage means 15 and rollers 22a, 22b, 23a, and 23b have been eliminated from reciprocating carriage means 16. Because the transporting belts are foraminous, the fleece can be conducted as a sandwich continuously from its introduction to transporting belt 26 to its separation from the transporting belts at the fleece delivery means; and there is no longer any need for extra rollers to provide constant tension on the belt.

The fleeces eligible for use with the crosslapper of this invention include all of those used on crosslappers of the prior art. Fleeces are, generally, made from fiber staple of about 0.25 to about 12 inches long and up to as much as about 50 denier, with a basis weight of about 0.2 to 20 ounces/square yard. Of course, the crosslapper of this invention can, also, be used to fold fabrics, to lay up composites, to ply sheets and films, and the like, to the same extent and purpose as the crosslappers of the prior art.

As has been pointed out above, the foraminous material used for the fleece transporting belts of this invention can be made from any material presently used for other foraminous belts such as those used in papermaking arts. They could be made from metallic wire although such is not preferred due to the excessive weight of the metal. They can be made from synthetic fibers or a combination of metallic wire and synthetic fibers. The fibers which are most often used in manufacture of fleece transporting belts of this invention include polyamides, polyesters, glass, or combinations of those materials. The fibers are usually monofilaments and they can be coated or not.

It is important that the fleece transporting belts be electrically conductive in order to eliminate any buildup of static electricity. Generation of static electricity is a common problem in handling fleece and such static electricity must be completely dissipated in order to avoid a disruption of the fleece transport and laydown. Wire belts are, of course, conductive. Belts made from synthetic fibers can have conductive particles or materials incorporated into the fibers, themselves, or a few metal wires or conductive fibers can be woven together with the nonconductive synthetic fibers or the fibers can have a conductive coating.

The weave which is used for the fleece transporting belts is not critical or particularly important so long as the weave is relatively open and is not such as will cause the fleece to become lodged in the belt and become difficult to pull away from the belt. It is believed that any relatively open weave which will release the fleece and will not pass fleece through the belt, is eligible for use in the fleece transporting belts of this invention.

One aspect of the fleece transporting belt which is important to practice of this invention is the degree of openness of the weave. Openness of a weave in foraminous belts such as those used in this invention can be measured by a parameter known as the air permeability. Air Permeability is determined by ASTM Test Method D 737-75 and is reported in units of $ft^3/ft^2min$ which can be converted to metric units ($cm^3/cm^2s$) by multiplying by a factor of 0.508. It is believed that belts having an air permeability as low as about 150 $ft^3/ft^2min$ would be operable in this invention, although an air permeability of 200–1200 $ft^3/ft^2min$ is much preferred.

DESCRIPTION OF THE PREFERRED EMBODIMENT

A fleece was prepared using the airlay device and process described in U.S. Pat. No. 3,906,588. The fleece was made up of polyester staple about 0.75 in (1.9 cm) long with a filament denier of about 1.35.

A crosslapper with a configuration similar to that of the device of FIG. 1, herein was fitted with foraminous fleece transporting belts made from carbon-filled, nylon monofilaments and polyester filaments in a weave pattern as shown in U.S. Pat. No. 3,851,681 and having an air permeability of about 725 $ft^3/ft^2$ min.

The fleece was introduced onto the fleece feed means of the crosslapper and the crosslapper was successfully operated at a rate exceeding 60 meters/minute.

As a control, attempts were made to operate the same crosslapper using impermeable fleece transporting belts; and the fleece could not be successfully conducted through the device at any speed.

In a second run, rayon staple about 1.5 inches long and of about 2–2.5 filament denier was carded into a 2-meter feed batt of about 2 ounces/square yard weight basis and was fed to a crosslapper having the same configuration as described above.

When the same foraminous fleece transporting belts described above were used, the crosslapper could be run at a speed in excess of 80 meters/minute. The upper operating limit was controlled by the upper limit of the crosslapper drive motor.

When impermeable belts of the prior art were used, the crosslapper could be operated at about 40–50 meters/minute. The upper operating limit was controlled by disruption and displacement of the fleece due to belt flapping and air movement eddys.

I claim:

1. A cross lapper comprising:

(i) fleece feed means;

(ii) [at least one] *a first* endless, foraminous, fleece transporting belt for accepting a fleece from the fleece feed means *and carrying the fleece along a path which included at least one turn, wherein said first belt is made from synthetic fibers and is electrically conductive*;

(iii) *a second fleece transporting belt arranged to transport the fleece wherein the fleece is, at times, substantially sandwiched between said first and second transporting belts;*

(*iv*) reciprocating belt carriage means for moving the fleece transporting [belt] *belts* continuously through the endless length of the [belt] *belts* and reciprocatingly in a rectilinear path; and

[iv] (*v*) fleece delivery means for accepting *the* fleece from *at least one of* the fleece transporting [belt] *belts* and moving it continuously in a rectilinear path substantially perpendicular to the path of the reciprocating belt carriage means;

*wherein the first and second transporting belts are maintained in substantially continuous contact with the fleece throughout the turns in the path thereof once the fleece has been received by both of said belts until the fleece is to be delivered to said fleece delivery means.*

[2. The crosslapper of claim 1 wherein the foraminous fleece transporting belt is made from synthetic fibers and is electrically conductive.]

3. The crosslapper of claim [2] *1* wherein foraminous fleece transporting belt exhibits an air permeability from 200–1200 $ft^3/ft^2$ min.

[4. The crosslapper of claim 1 wherein there are two fleece transporting belts.]

5. The crosslapper of claim 1 wherein the fleece feed means is one end of a fleece transporting belt.

[6. A crosslapper comprising:

(i) fleece feed means;

(ii) at least one endless, foraminous, fleece transporting belt for accepting fleece from the fleece feed means;

(iii) reciprocating belt carriage means for moving the fleece transporting belt continuously through the endless length of the belt and reciprocatingly in a rectilinear path; and (iv) fleece delivery means for accepting fleece from the fleece transporting belt to be moved continuously in a rectilinear path substantially perpendicular to the path of the reciprocating belt carriage means.]

[7. The crosslapper of claim 6 wherein the foraminous fleece transporting belt is made from synthetic fibers and is electrically conductive.]

[8. The crosslapper of claim 7 wherein foraminous fleece transporting belt exhibits an air permeability from 200–1200 $ft^3/ft^2$ min.]

[9. The crosslapper of claim 6 wherein there are two fleece transporting belts.]

[10. The crosslapper of claim 6 wherein the fleece feed means is one end of a fleece transporting belt.]

[11. A crosslapper comprising:

(i) at least one endless, foraminous, fleece transporting belt for accepting fleece from a fleece feeding means;

(ii) reciprocating belt carriage means for moving the fleece transporting belt continuously through the endless length of the belt and reciprocatingly in a rectilinear path; and (iii) fleece delivery means for accepting fleece from the fleece transporting belt and moving it continuously in a rectilinear path substantially perpendicular to the path of the reciprocating belt carriage means.]

[12. The crosslapper of claim 11 wherein the foraminous fleece transporting belt is made from synthetic fibers and is electrically conductive.]

[13. The crosslapper of claim 12 wherein foraminous fleece transporting belt exhibits an air permeability from 200–1200 $ft^3/ft^2$ min.]

[14. The crosslapper of claim 11 wherein there are two fleece transporting belts.]

[15. The crosslapper of claim 11 wherein the fleece feed means is one end of a fleece transporting belt.]

[16. A crosslapper comprising:

(i) at least one endless, foraminous, fleece transporting belt for accepting fleece from a fleece feeding means;

(ii) reciprocating belt carriage means for moving the fleece transporting belt continuously through the endless length of the belt and reciprocatingly in a rectilinear path;

(iii) fleece delivery means for accepting fleece from the fleece transporting belt; and (iv) fleece receiving means for accepting fleece from the fleece delivery means and moving it continuously in a rectilinear path substantially perpendicular to the path of the reciprocating belt carriage means.]

[17. The crosslapper of claim 16 wherein the foraminous fleece transporting belt is made from synthetic fibers and is electrically conductive.]

[18. The crosslapper of claim 17 wherein foraminous fleece transporting belt exhibits an air permeability from 200–1200 $ft^3/ft^2$ min.]

[19. The crosslapper of claim 16 wherein there are two fleece transporting belts.]

[20. The crosslapper of claim 16 wherein the fleece feed means is one end of a fleece transporting belt.]

*21. A cross lapper comprising:*

*a fleece feed conveyor for delivering a fleece;*

*first and second endless, foraminous, fleece transporting belts for accepting a fleece from the fleece feed conveyor and carrying the fleece along a path which includes at least one turn wherein the fleece is, at times, substantially sandwiched between said first and second transporting belts;*

*a reciprocating belt carriage for reciprocatingly moving the fleece transporting belts continuously through the endless length of the belts and reciprocatingly in a rectilinear path; and*

*a fleece delivery conveyor for accepting the fleece from at least one of the fleece transporting belts and moving it continuously in a rectilinear path substantially perpendicular to the path of the reciprocating belt carriage;*

*wherein said first and second transporting belts are maintained in substantially continuous contact with the fleece throughout the turns in the path thereof once the fleece has been received by both of said belts until the fleece is to be delivered to said fleece delivery conveyor.*

* * * * *